(12) United States Patent
Correll, Jr.

(10) Patent No.: US 9,939,842 B2
(45) Date of Patent: Apr. 10, 2018

(54) ELECTRONIC DEVICE COMBINATION

(71) Applicant: Carroll Boston Correll, Jr., Winchester, VA (US)

(72) Inventor: Carroll Boston Correll, Jr., Winchester, VA (US)

( * ) Notice: Subject to any disclaimer, the term of this patent is extended or adjusted under 35 U.S.C. 154(b) by 211 days.

(21) Appl. No.: 14/147,315

(22) Filed: Jan. 3, 2014

(65) Prior Publication Data

US 2014/0187288 A1 Jul. 3, 2014

Related U.S. Application Data

(60) Provisional application No. 61/748,660, filed on Jan. 3, 2013.

(51) Int. Cl.
  *G06F 1/16* (2006.01)
  *H04M 1/02* (2006.01)
  *H04M 1/725* (2006.01)

(52) U.S. Cl.
  CPC .......... *G06F 1/1607* (2013.01); *G06F 1/1626* (2013.01); *G06F 1/1632* (2013.01); *G06F 1/1656* (2013.01); *G06F 1/1698* (2013.01); *H04M 1/0266* (2013.01); *H04M 1/72527* (2013.01)

(58) Field of Classification Search
  CPC .... G06F 1/1607; G06F 1/1626; G06F 1/1632; G06F 1/1656; G06F 1/1698; H04M 1/0266; H04M 1/72527
  See application file for complete search history.

(56) References Cited

U.S. PATENT DOCUMENTS

| | | | |
|---|---|---|---|
| 6,859,219 B1 * | 2/2005 | Sall | G06F 1/1607 345/1.1 |
| 8,018,715 B2 | 9/2011 | Chang | |
| 8,072,392 B2 | 12/2011 | Lection | |
| 2004/0135738 A1 * | 7/2004 | Kim | G06F 1/1616 345/1.1 |
| 2007/0153456 A1 | 7/2007 | Lin | |
| 2012/0057288 A1 * | 3/2012 | Chou | G06F 1/1628 361/679.09 |
| 2012/0309462 A1 * | 12/2012 | Micev | G06F 1/1632 455/566 |
| 2013/0109371 A1 * | 5/2013 | Brogan | G06F 1/1626 455/420 |
| 2013/0250492 A1 * | 9/2013 | Wong | G06F 1/1641 361/679.01 |

(Continued)

FOREIGN PATENT DOCUMENTS

WO    WO 2014122656 A1 *   8/2014   .......... G06F 1/1616

*Primary Examiner* — Mehmood B Khan
(74) *Attorney, Agent, or Firm* — Roberts Mlotkowski Safran Cole & Calderon P.C

(57) ABSTRACT

A combination of a first device and a second device is provided. The first device may include a tablet dock and the second device may include a mobile communication device such as a phone. The tablet dock may include a docking slot with an inner rim and an input. The phone may be sized to fit within the docking slot and may include an outer rim that slidably engages and releasably attaches to the inner rim. The outer rim may include an output that connects with the input. Therefore, when the phone is docked within the docking slot, a full sized tablet may be activated using data from the phone.

9 Claims, 3 Drawing Sheets

(56) References Cited

U.S. PATENT DOCUMENTS

2014/0349708 A1* 11/2014 Ryan ................ G06F 1/1632
455/556.1
2015/0092329 A1* 4/2015 Balasundaram ........ G06F 1/165
361/679.09

* cited by examiner

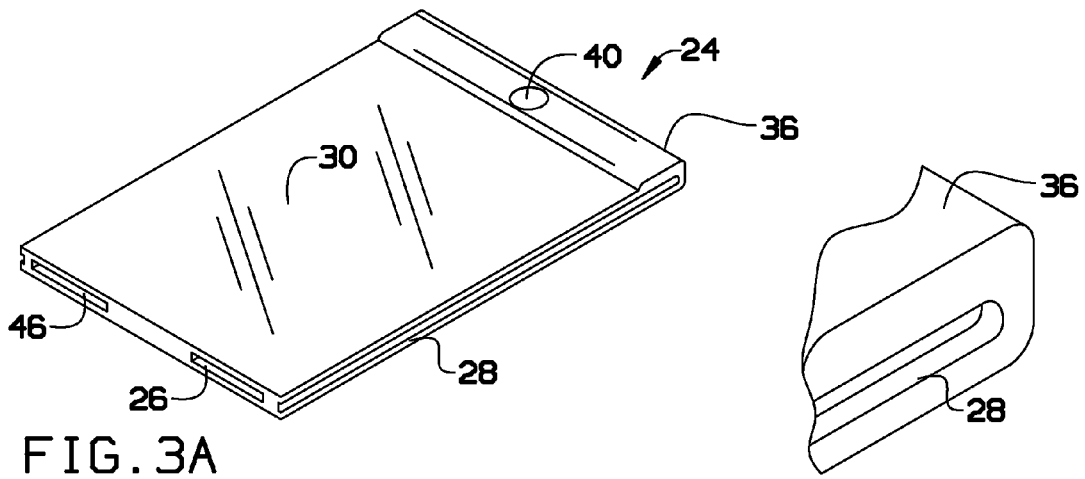
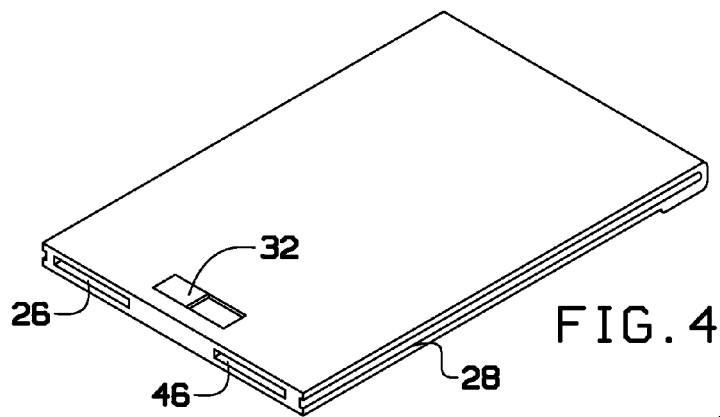
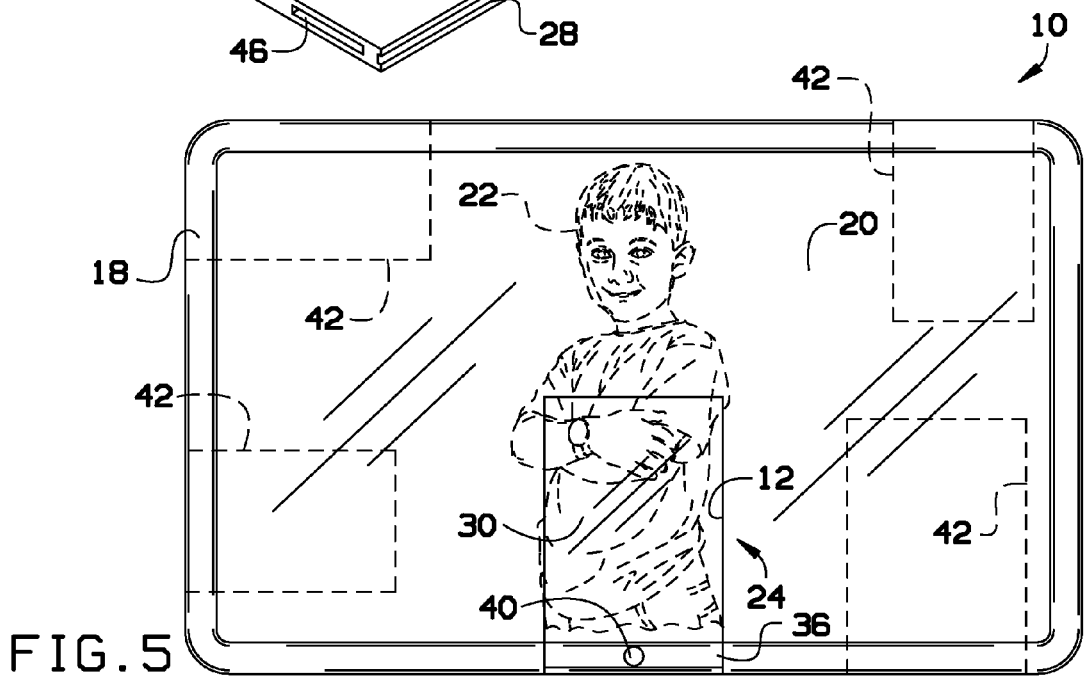

ELECTRONIC DEVICE COMBINATION

CROSS-REFERENCE TO RELATED APPLICATION

This application claims the benefit of priority of U.S. provisional application no. 61/748,660, filed Jan. 3, 2013, the contents of which are herein incorporated by reference.

BACKGROUND OF THE INVENTION

The present invention relates to an electronic device combination and, more particularly, to a mobile communication device such as a phone that may be connected to a tablet dock.

Some mobile phones are very large and on the verge of being a tablet. The drawback is that they can be considered "clunky" and not easily carried by the user. On the other hand, if a phone is too small the user may encounter operability issues related to small lettering, visual media that may be difficult to see, or haptic input recognition that may arise from the use of a small screen. Tablets are similarly caught in the industry-wide struggle of when a device is too small or too large. In general, tablets suffer from mobility issues related to their size. For example, a user cannot easily go for a run with a tablet attached to their arm if they wanted to listen to music. Furthermore, by using two separate devices a user is burdened by the space required for both including the need for two sets of required and optional accessories. These may include, but are not limited to, separate power plugs and audio listening devices such as headsets.

As can be seen, there is a need for an easily combinable tablet and mobile communication device such as a phone.

SUMMARY OF THE INVENTION

In one aspect of the present invention, a combination electronic device comprises: a first device comprising a first display screen and a docking slot, wherein the docking slot comprises an inner rim comprising an input and one of a male and female component; a second device comprising a second display screen and an outer rim, wherein the second device is formed to fit within the docking slot, and wherein the outer rim comprises an output and one of a male and female component interferrably complementary of the inner rim, wherein the male and female components of the inner rim and the outer rim releasably engage one another connecting the output to the input, thereby releasably attaching the second device to the first device, wherein the first display screen and the second display screen are aligned along the same plane when the first device and the second device are connected, thereby forming an overall display screen.

These and other features, aspects and advantages of the present invention will become better understood with reference to the following drawings, description and claims.

BRIEF DESCRIPTION OF THE DRAWINGS

FIG. 3A is a perspective view of the present invention with the phone of FIG. 1 rotated 180 degrees;
FIG. 3B is a detail view of the channel of FIG. 3A;
FIG. 4 is a back view of the phone of FIG. 1 rotated 180 degrees;
FIG. 5 is a top view of the present invention shown in assembled configuration.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a combination of a first device and a second. The first device may include a tablet dock and the second device may include a phone. The tablet dock may include a docking slot with an inner rim and an input. The mobile communication device such as a mobile phone may be sized to fit within the docking slot and may include an outer rim that slidably engages and releasably attaches to the inner rim. The outer rim may include an output that connects with the input. Therefore, when the phone is docked within the docking slot, a full sized tablet may be activated using data from the phone.

The present invention may allow two devices to combine with one another to form a single unit tablet. Further, the present invention may allow a user to separate the devices to use as a mobile communication device such as a mobile phone. In such embodiments, the mobile phone may neither be too large or cumbersome to use and a tablet device may not be too small because a user may use the phone separately or combine the devices to use as a tablet. Further, the invention eliminates the need for separate power plugs since the tablet device may charge the phone either from an independent internal battery or from a single wall plug that is used when the device is unified or separate. Further, when the phone is docked into the tablet, a user may also be able to plug in headphones to the tablet to allow the user to enjoy a conversation across a cellular network while at the same time enjoying the convenience of viewing a larger screen.

The present invention provides a unified tablet device and mobile phone. The unified device may save space in that it may not require two standalone devices nor would it require two charging cords as the mobile phone may charge while docked with the tablet device or may be directly hooked up to an AC adapter. The device may further save money since the user may not need separate cellular commitments because the user may make cellular calls using cellular networks when the mobile phone is docked.

The present invention, when mechanically unified, may also facilitate data exchange between the two devices. Once this occurs an added benefit is that data can be exchanged. This may include, but are not limited to, a user wishing to sync music playlists, photographs, and documents from their tablet to their mobile phone. Once the devices are disconnected, both can be up to date with recent additions from the other device.

Figure 1:
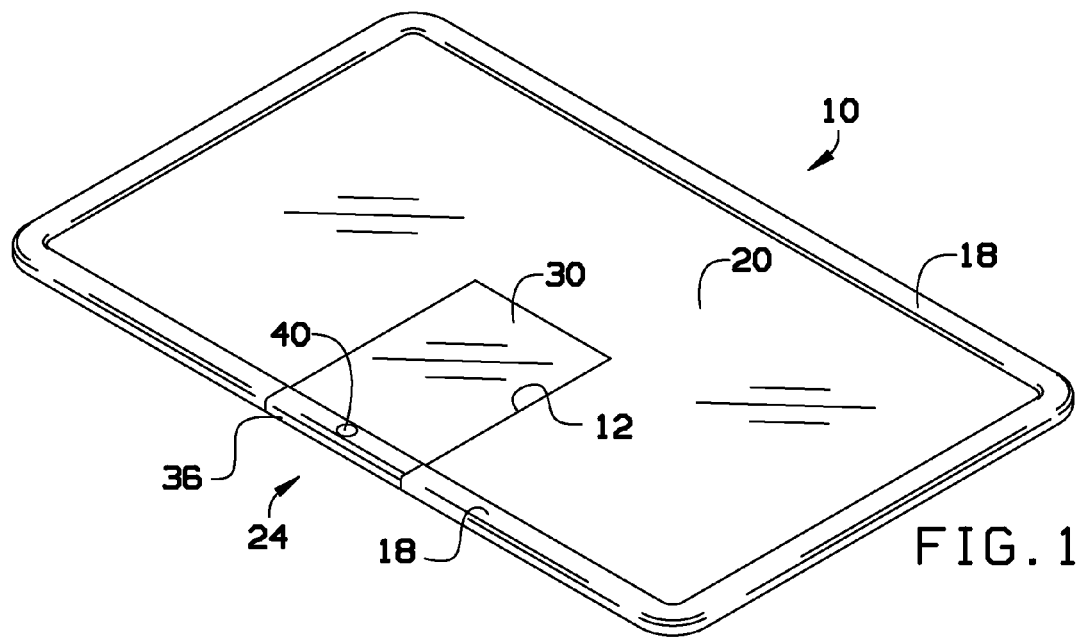
FIG. 1 is a perspective view of the present invention.
Figure 2:
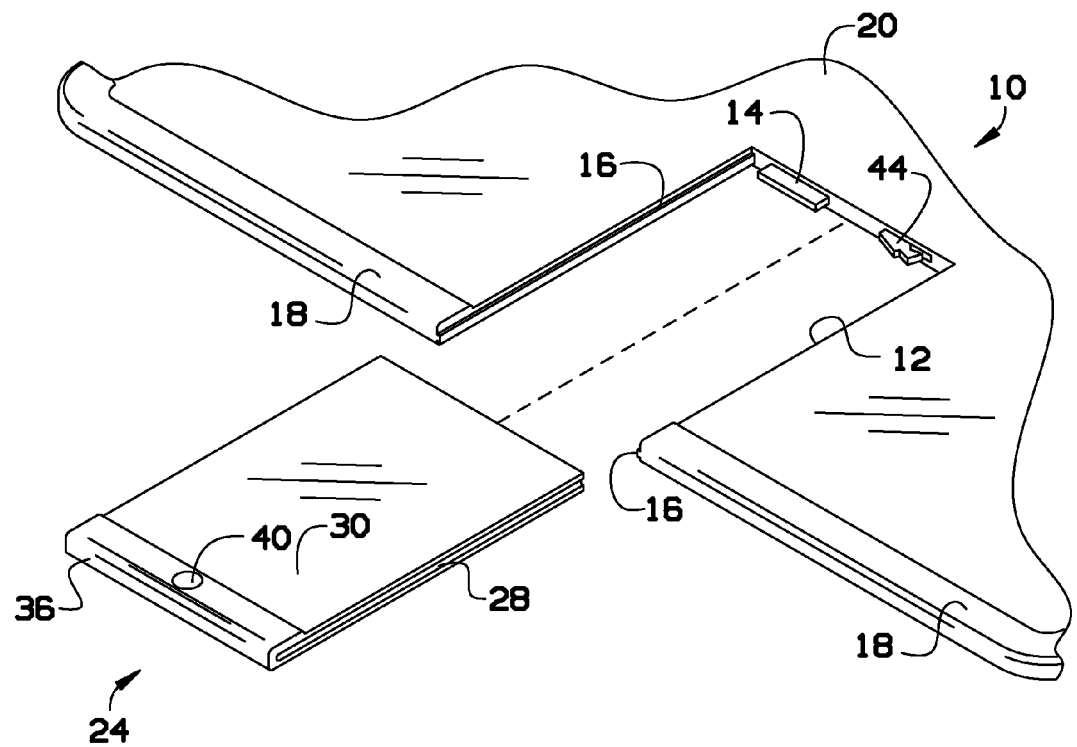
FIG. 2 is a detail exploded view of the present invention.
Figure 6:
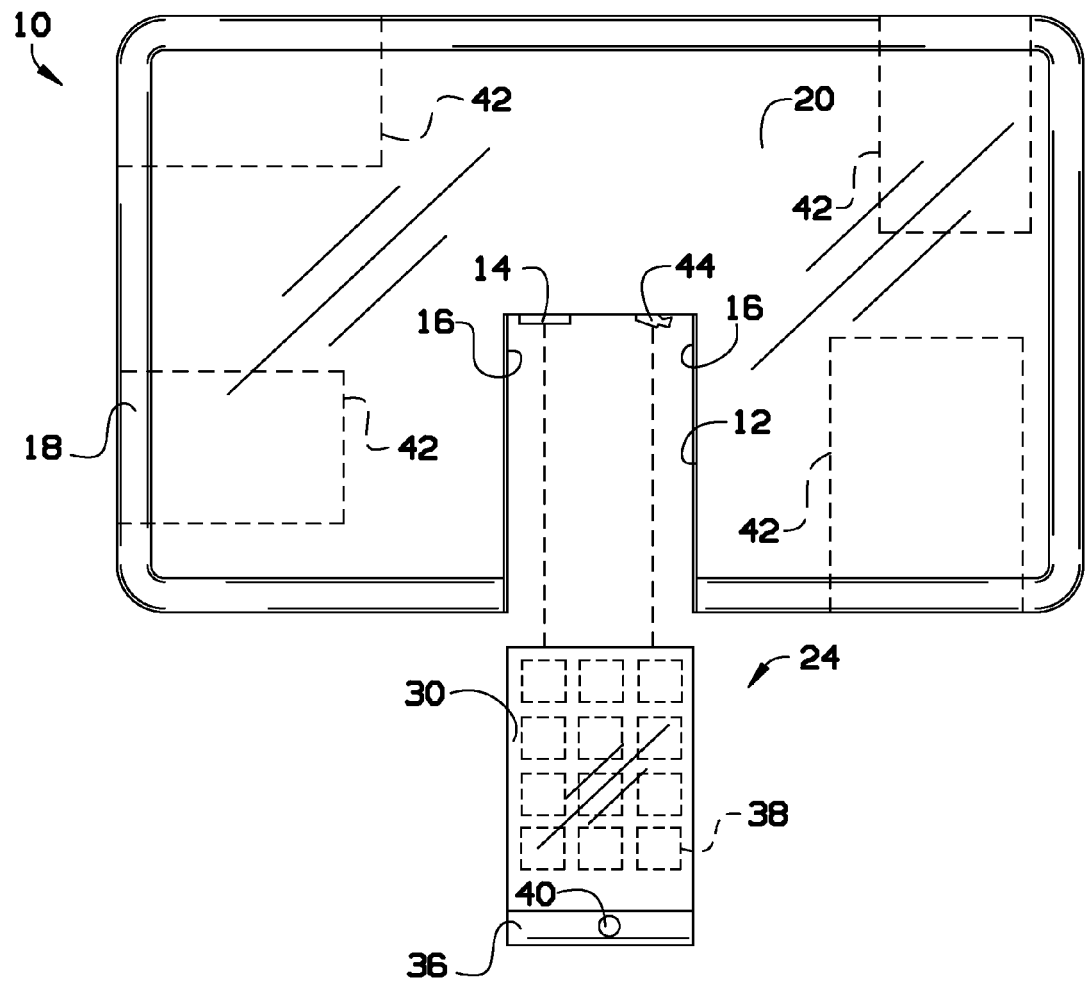
FIG. 6 is an exploded view of the present invention.

Referring now to FIGS. 1 through 6, the device may include a first device and a second device. The first device may be tablet dock 10 and the second device may be a mobile phone 24. The tablet dock 10 may include a docking slot 12. The docking slot 12 may include an inner rim having a first side, a second side, and an inner end. In certain embodiments, the inner end of the docking slot 12 may include an input such as a tablet port 14. The tablet port 14 may be a male port that connects with the phone 24. When connected, the tablet dock 10 may display an output of the phone 24 on the tablet screen 20 and phone screen 30 to provide an overall display screen 22.

The inner rim of the docking slot 12 may further include one of a male and female component. In certain embodiments, the one of the male and female component may include a dock rail 16. The dock rail 16 may be located on the two sides of the inner rim of the docking slot 12. In certain embodiments, the dock rail 16 may include protruding ridges. The docking slot 12 may further include a latch 44. The latch 44 may also be located at the end of the docking slot 12. In certain embodiments, the latch 44 may be spring loaded. The latch 44 may be used to secure the phone 24 to the tablet dock 10. The tablet dock 10 may further include a tablet bezel 18 that matches a phone bezel 36 of the phone. In a different embodiment, the docking slot 12 includes a magnet or other magnetic material as substitute for a locking latch system to secure the phone 24 in place.

In certain embodiments, the phone 24 may be sized to fit within the docking slot 12 of the tablet dock 10. The phone 24 may include an outer rim that may include a first side, a second side, a top end and a bottom end. The top end of the phone 24 may include an output, such as a phone port 26. The phone port 26 may be used to charge the phone. Further, the phone port 26 may transfer data to the tablet dock 10 when connected to the input. In certain embodiments, the phone port 26 is a female port that may receive the tablet port 14.

The top of the phone 24 may further include a lock latch slot 46 to receive and lock with the locking latch 44 of the tablet dock 10. The phone 24 may further include a lock switch 32. The lock switch 32 may be on the back of the phone 24 and may control the lock latch slot 46. The outer rim of the phone 24 may include one of a male and female component. For example, the two sides of the phone 24 may include a rail 28. The rail 28 may include receiving channels. The receiving channels may receive the protruding ridge of the dock rail 16. As mentioned above, the phone 24 may further include an attachment piece such as a magnet or other magnetic material as substitute for or used with the locking latch 46 and lock switch 32.

The front of the phone may include a phone screen 30 and the phone bezel 36 at the bottom of the phone 24. The bezel 36 may include a camera 40. However, a camera 40 may also be placed on the back of the phone 24. The mobile phone 24 may not have a plastic border separation other than the bezel 36 on the bottom. The tablet dock 10 screen and the phone 24 screen are aligned along the same plane when the tablet dock 10 and the phone 24 are connected. Therefore, when attached to the tablet dock 10, the phone 24 may be seamless with the tablet dock 22 and provide one large tablet screen display 22. As illustrated in FIG. 5, the docking slot 12 may be in multiple locations.

In use, the phone 24 may be used separately as a mobile device. However, if the user would like to use the phone 24 as a tablet with a larger screen, the user may insert the phone 24 into the tablet docking slot 12. The dock rail 16 may match up with the phone rail 28, i.e. the receiving channel may receive the protruding ridge. The user may snap the phone 24 into the tablet docking slot 12. This may be done by engaging the phone port 26 and the lock latch slot 46 of the phone 24 with the tablet port 14 and latch 44 of the tablet docking slot 12. Once the lock switch 32 has engaged the latch 44, the phone 24 may be secured within the tablet docking slot 12 and the device may be used as a tablet. To disengage the phone 24 from the tablet dock 10, the user may activate the lock switch 32. The lock switch 32 may include a slide lock, button or the like.

In certain embodiments, a user may want to use a mobile phone to take with them on the go. In the event that the mobile phone is charged to the satisfaction of the user, the user may unlock and slide the phone out. At that point, the tablet could power down and/or attached to a charging mechanism. Due to a phone being too small for major word-processing tasks, the use may later push the phone into place and form a unified tablet. In addition to the ability to make and receive phone calls from the unified device, the user may also compose word documents or engage in other activities that are more suited to a tablet than a mobile phone.

It should be understood, of course, that the foregoing relates to exemplary embodiments of the invention and that modifications may be made without departing from the spirit and scope of the invention as set forth in the following claims.

What is claimed is:

1. A combination electronic device comprising:
   a first device comprising a first display screen having opposing side edges and a docking slot disposed between the opposing side edges, wherein the docking slot comprises a recessed portion in the first display screen having opposing sides that define a gap in an image-displaying portion of the first display screen and having an inner rim comprising an input and one of a male and female component, the opposing side edges of the first display screen being parallel to the opposing sides of the recessed portion;
   a second device comprising a second display screen and an outer rim, wherein the second device is formed to fit within the docking slot, and wherein the outer rim comprises an output and one of a male and female component opposite of the inner rim,
   wherein the male and female components of the inner rim and the outer rim slidably engage one another connecting the output to the input, thereby releasably attaching the second device to the first device,
   wherein the first display screen and the second display screen are aligned along the same plane when the first device and the second device are connected, thereby forming an overall display screen wherein the second display screen fills the recessed portion of the first display screen and fills the gap in the image-displaying portion of the first display screen,
   wherein the opposing sides of the inner rim of the recessed portion of the first device comprise a first rail member and opposing sides of the outer rim of the second device comprise a second rail member that slidably engages with the first rail member, and
   wherein the recessed portion of the first display screen is U-shaped and extends into the image-displaying portion of the first display screen such that portions of the first display screen between its opposing side edges and the opposing sides of the recessed portion form part of the image display portion.

2. The combination electronic device of claim 1, wherein the first device comprises a tablet dock and the second device comprises a mobile communication device.

3. The combination electronic device of claim 1, wherein the first rail member comprises a channel and the second rail member comprises a ridge.

4. A combination electronic device comprising:
a first device comprising a first display screen and a docking slot, wherein the docking slot comprises an inner rim comprising an input and one of a male and female component;
a second device comprising a second display screen and an outer rim, wherein the second device is formed to fit within the docking slot, and
wherein the outer rim comprises an output and one of a male and female component opposite of the inner rim, wherein the male and female components of the inner rim and the outer rim slidably engage one another connecting the output to the input, thereby releasably attaching the second device to the first device,
wherein the first display screen and the second display screen are aligned along the same plane when the first device and the second device are connected, thereby forming an overall display screen;
wherein the inner rim of the first device comprises a first rail member and the outer rim of the second device comprises a second rail member that slidably engages with the first rail member,
wherein the first rail member comprises a channel and the second rail member comprises a ridge, and
wherein the inner rim of the first device comprises a latch and the outer rim of the second device comprises a lock latch slot, wherein the latch and the lock latch slot releasably connect the first device with the second device.

5. A combination electronic device comprising:
a first device comprising a first display screen and a docking slot, wherein the docking slot comprises an inner rim comprising an input and one of a male and female component;
a second device comprising a second display screen and an outer rim, wherein the second device is formed to fit within the docking slot, and
wherein the outer rim comprises an output and one of a male and female component opposite of the inner rim, wherein the male and female components of the inner rim and the outer rim slidably engage one another connecting the output to the input, thereby releasably attaching the second device to the first device,
wherein the first display screen and the second display screen are aligned along the same plane when the first device and the second device are connected, thereby forming an overall display screen;
wherein the inner rim of the first device comprises a first rail member and the outer rim of the second device comprises a second rail member that slidably engages with the first rail member,
wherein the first rail member comprises a channel and the second rail member comprises a ridge, and
wherein the inner rim comprises a first side, a second side, and an inner end, and the outer rim comprises a first side, a second side and a top end, wherein the first side and the second side of the inner rim comprise the ridge, and the first side and the second side of the outer rim comprises the channel.

6. The combination electronic device of claim 1, wherein the inner rim of the first device is magnetically attracted to the outer rim of the second device.

7. The combination electronic device of claim 2, wherein the first device comprises a tablet bezel, and the second device comprises a phone bezel, wherein the tablet bezel and the phone bezel are aligned when the phone and tablet are connected.

8. The combination electronic device of claim 1, further comprising a latch mechanism that releasably connects the first device with the second device.

9. A combination electronic device comprising:
a first device comprising a first display screen having opposing side edges and a docking slot disposed between the opposing side edges, wherein the docking slot comprises a recessed portion in the first display screen having opposing sides that define a gap in an image-displaying portion of the first display screen and having an inner rim comprising a data-conductive input, the opposing side edges of the first display screen being parallel to the opposing sides of the recessed portion;
a second device comprising a second display screen and an outer rim, wherein the second device is formed to fit within the docking slot, and wherein the outer rim comprises output opposite of the inner rim,
wherein the data conductive output slidably engages the data conductive input, thereby electrically connecting the output and input and releasably attaching the second device to the first device,
wherein the first display screen and the second display screen are aligned along the same plane when the first device and the second device are connected, thereby forming an overall display screen wherein the second display screen fills the recessed portion of the first display screen and fills the gap in the image-displaying portion of the first display screen, and
wherein the recessed portion of the first display screen is U-shaped and extends into the image-displaying portion of the first display screen such that portions of the first display screen between its opposing side edges and the opposing sides of the recessed portion form part of the image display portion.

* * * * *